United States Patent [19]
Paglia

[11] 3,779,144
[45] Dec. 18, 1973

[54] PHOTOGRAPHIC FILM PROCESSING APPARATUS AND CAMERA SYSTEM EMPLOYING SAME

[75] Inventor: Richard Paglia, Carlisle, Mass.

[73] Assignee: Polaroid Corporation, Cambridge, Mass.

[22] Filed: Apr. 24, 1972

[21] Appl. No.: 246,817

[52] U.S. Cl. .................. 95/14, 95/89 A, 241/231
[51] Int. Cl. ............................................ G03d 3/00
[58] Field of Search .................. 95/13, 14, 89 A, 95/89 L; 241/230, 231

[56] References Cited
UNITED STATES PATENTS

| | | | |
|---|---|---|---|
| 3,561,340 | 2/1971 | Erlichman | 95/13 |
| 3,505,943 | 4/1970 | Bellows | 95/13 X |
| 3,625,130 | 12/1971 | Van Allen | 95/14 X |
| 3,245,335 | 4/1966 | Sable | 95/13 X |

Primary Examiner—Samuel S. Matthews
Assistant Examiner—Michael D. Harris
Attorney—Robert L. Berger

[57] ABSTRACT

Fluid spreading apparatus for use in cameras of the self-developing type. A spread roller assembly comprises a relatively thin sheet metal mounting bracket having a pair of upturned ears connected together by an elongated support. An elongated rigid support member formed of a light weight material is connected to the bracket support to enhance the rigidity of the assembly. Rotatably mounted between the bracket ears is an elongated spreader roller adapted to be driven by an energy source. A shaft is mounted between the bracket ears for translatory motion towards and away from the aforementioned spreader roller and has a hollow spreader roller rotatably mounted thereon. A specially configured elongated torsion spring is retained by the bracket and rigid support member whereby its respective ends engage the aforementioned shaft intermediate the bracket ears and the hollow spreader roller to yieldably urge the hollow spreader roller towards the other spreader roller. This fluid spreading apparatus is mounted for displacement across an entrance to a film magazine receiving chamber of a camera and a portion of its mounting bracket serves to locate the film magazine in its opertive position.

22 Claims, 10 Drawing Figures

PHOTOGRAPHIC FILM PROCESSING APPARATUS AND CAMERA SYSTEM EMPLOYING SAME

BACKGROUND OF THE INVENTION

1. Field of the Invention

This invention relates to photography and, more particularly, to an improved fluid spreading apparatus and camera system incorporating same.

2. Description of the Prior Art

The advantages of cameras of the self-developing type are well recognized. Commercially available cameras of this type provide fully developed black-and-white photographs in approximately 15 seconds and fully developed photographs in full color in less than one minute. While customer interest in these products is a matter of proven record, it is apparent that the market for self-developing cameras can be significantly increased by eliminating and/or improving certain characteristics of the presently offered products. For instance, it is desirable to further reduce the size and weight of such camera systems whenever this can be accomplished without reducing the size of the print which they produce. Also, it is desirable to provide systems which further simplify the task of the photographer. In this context, specially compact collapsible self-developing camera structures have been heretofore devised. Typical of such structures are those disclosed in U.S. Pat. No. 3,643,565 by Alfred H. Bellows entitled FOLDING CAMERA WITH DEVELOPING MEANS and in copending U.S. patent application Ser. No. 246,703 by Richard R. Wareham and Richard Paglia entitled SELF-DEVELOPING CAMERA SYSTEM filed concurrently herewith. These particular systems record an image of the scene of interest and provide the photographer with a waste-free photograph of same responsive to one-step operation of an actuator button. They include an energy source which, in part, is employed to effect the advancement of an exposed film unit through a fluid spreading assembly and thence from the camera housing. Film units typical of the type suitable for use with those prior art camera structures are disclosed in U.S. Pat. No. 3,415,644 by Edwin H. Land entitled NOVEL PHOTOGRAPHIC PRODUCTS AND PROCESSES and in copending U.S. patent application Ser. No. 194,407 by Edwin H. Land entitled NOVEL PRODUCTS AND PROCESSES filed on Nov. 1, 1971. One of the more critical elements in these particular camera systems is their fluid spreading system and it is obviously important to further reduce the size and weight of such systems and to further enhance their effectiveness and reliability.

Certain of these systems employ a film magazine having an arrangement for controlling the movement of a mass of processing fluid across an exposed film unit responsive to that film unit being advanced from the magazine. The location of such a control arrangement of the film magazine with respect to the fluid spreading system itself is a critical consideration and it is obviously desirable to provide a simplified arrangement for effecting to proper positioning of these elements with respect to one another. In a more general context, it is desirable to provide a simplified arrangement for locating the film magazine itself in its operative position within the camera system.

One of the objects of this invention therefore is to provide an improved apparatus for treating an exposed film unit with a processing fluid and an improved camera system incorporating such apparatus.

Another primary object of this invention is to provide improved spreader roller apparatus.

An additional object of the present invention is to provide improved fluid spreading apparatus which is uniquely light in weight and compact.

Also an object of this invention is to provide a self-developing camera system for use with a film magazine having means for controlling the movement of a mass of processing fluid across an exposed film unit wherein the camera system includes an improved arrangement for locating such control means of the magazine.

A further object of this invention is to provide an improved arrangement for locating a film magazine in its operative position within a self-developing camera system.

SUMMARY OF THE INVENTION

The present invention comprises a combination of specially devised components arranged to provide a uniquely compact and light weight fluid spreading apparatus. This apparatus may be employed in a self-developing camera system to properly locate a film magazine therein.

In its illustrated embodiment, the present invention has been depicted as spreading a processing fluid in a layer between a pair of elements, at least one of which forms part of a film unit, in a compact collapsible self-developing camera. The invention comprises a mounting bracket, preferably formed of relatively thin sheet metal, having a pair of ears connected together by an elongated support. An elongated light weight rigid support member, preferably formed of a polymeric material, is connected to the bracket support to substantially preclude deflection of the mounting bracket during film processing operations. The mounting bracket and rigid support member in combination serve to retain a uniquely configured torsion spring. A first spreader roller is rotatably mounted between the bracket ears and includes a spur gear by which it may be connected to a source of energy to impart a rotary motion thereto. A hollow spreader roller is disposed in juxtaposition with respect to the first spreader roller being rotatably mounted on a shaft extending between the bracket ears. Further, respective ends of the aforementioned shaft are slideably positioned in elongated slots of the bracket ears facilitating translatory movement of the hollow spreader roller towards and away from the first spreader roller. In this connection, flattened ends of the torsion spring are seated in annular recesses of the shaft intermediate the ends of the hollow spreader roller and the adjacent bracket ear.

Further in the illustrated embodiment, extensions of the bracket ears are pivotally connected to a first housing member of a camera while a second housing member of that camera is connected to the bracket support. When in a first position, the fluid spreading apparatus is disposed in blocking relationship with respect to a film magazine receiving chamber of the camera, and when pivotally displaced into a second position, the fluid spreading apparatus is not disposed in such blocking relationship thereby facilitating the introduction of a film magazine into the camera and the subsequent removal of that film magazine from the camera. A portion of the fluid spreading apparatus engages the film magazine to locate the magazine in its operative position within the camera system. At such times, fluid control means of the film magazine are disposed a predetermined distance from the spreader rollers.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment when read in connection with the accompanying drawings wherein like numbers have beem employed in the different figures to denote the same parts and wherein:

DESCRIPTION OF THE ILLUSTRATED EMBODIMENT

In its illustrated embodiment, the present invention is depicted as being incorporated in a compact collapsible self-developing camera 10 which in many respects generally conforms to the camera structure disclosed and described in considerable detail in U. S. Pat. No. 3,714,879 by Edwin H. Land et al. entitled REFLEX CAMERA issued Feb. 6, 1973. This camera 10 is illustrated in its extended operative condition in FIG. 1 and in its storage or collapsed inoperative condition in FIG. 2. Referring now to those figures, and FIG. 3, it will be seen that the camera 10 includes a plurality of housing members 12, 14, 16 and 18 which are pivotally coupled to one another at pivots 20, 22, 24 and 26 for relative movement between the compact collapsed inoperative condition of FIG. 2 and the extended operative condition of FIGS. 1 and 3. Additionally, a housing member 28 extending in front of the housing member 18 is pivotally connected thereto, in a manner to be later described, at pivot 30 for movement in a clockwise direction as viewed in FIG. 3. In this connection, the housing member 28 mounts a spread roller assembly 32 including juxtaposed rollers 34 and 36 resiliently urged together by a torsion spring 156 (See FIG. 4). The present invention is particularly concerned with the nature of this spread roller assembly 32, which will be discussed in considerable detail hereinafter.

Figures 1, 2:
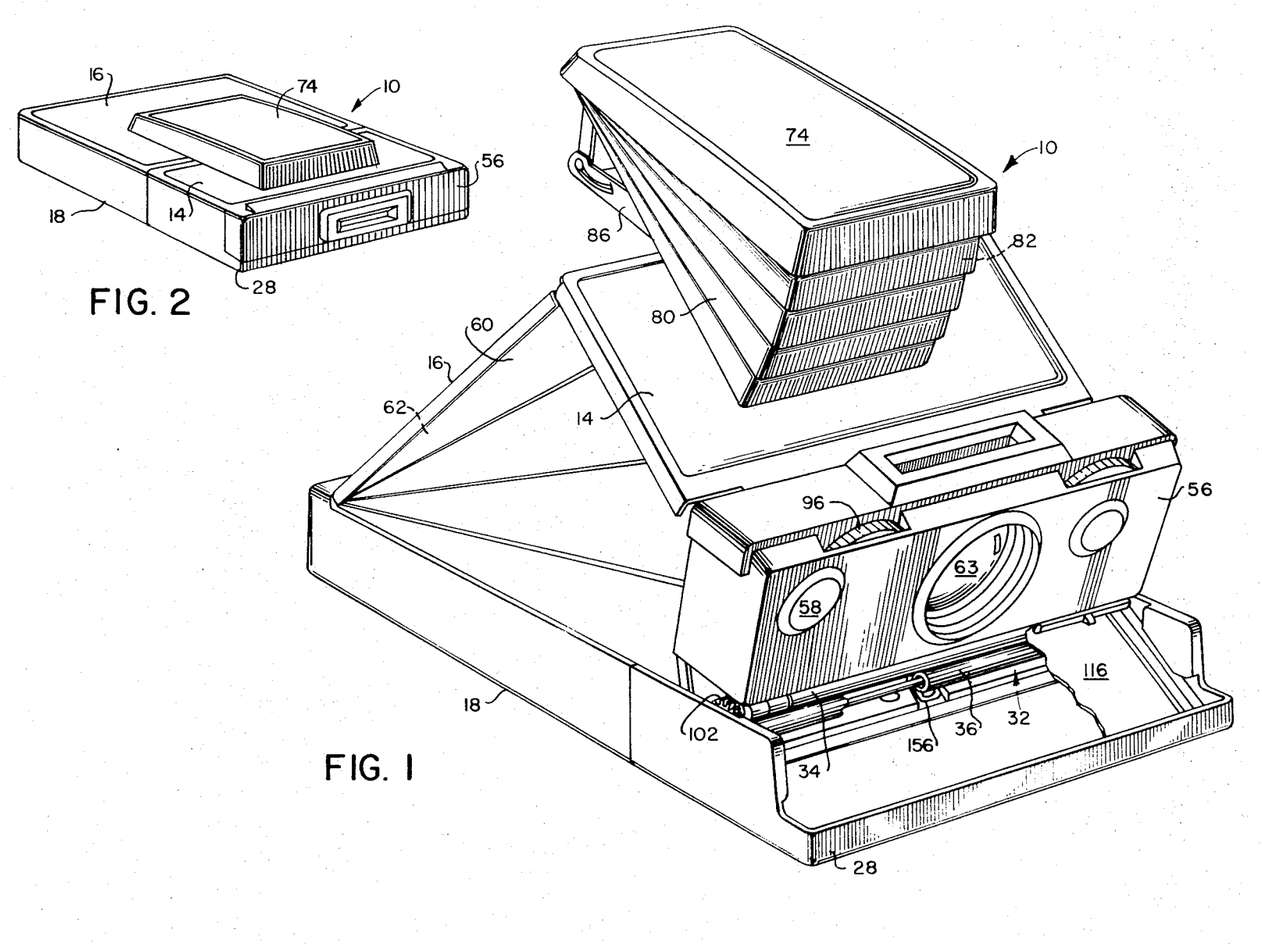
FIG. 1 is a perspective view diagrammatically depicting a collapsible self-developing camera disposed in its operative condition and incorporating the present invention.
FIG. 2 is a perspective view of the camera of FIG. 1 disposed in its collapsed or storage condition.
Figures 3, 10:
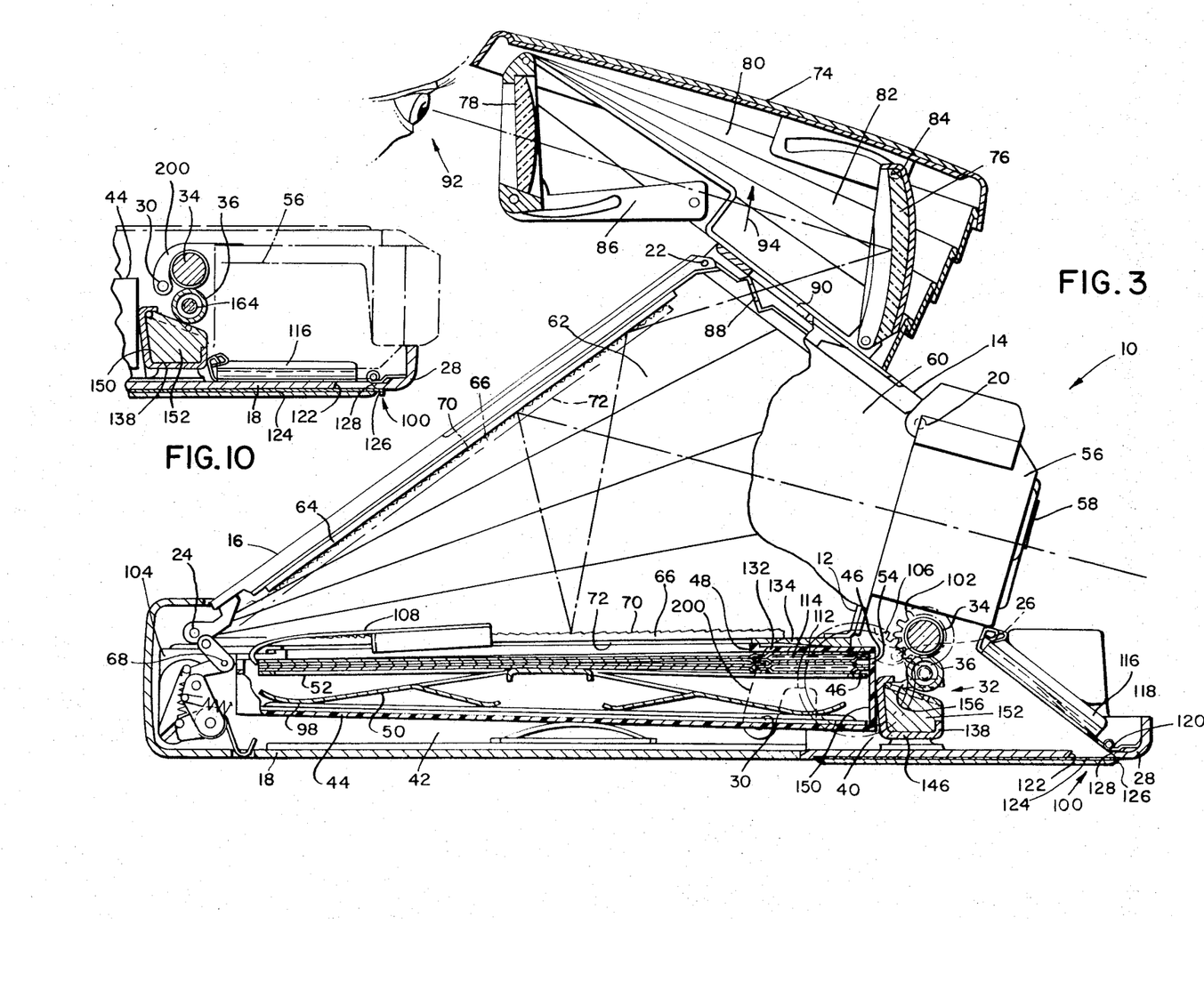
FIG. 3 is a diagrammatic, partially cut-away, side elevation view of the camera shown in FIG. 1.
FIG. 10 is a view of a section of the camera as shown in FIG. 1 when the camera is disposed in its collapsed or storage condition.

When the camera 10 is disposed in its extended condition of FIGS. 1 and 3, the spread roller assembly 32 is positioned across an entrance 40 to a film magazine receiving chamber 42. Consequently, the pivotal connection between the housing members 18 and 28 permits the latter to be displaced with respect to the former to remove the spread roller assembly 32 from its blocking position across the entrance 40 to facilitate the loading of the camera 10 with a film magazine 44. Each such film magazine 44 includes a plurality of suitable film units 46 which, for instance, may take the form of those previously indicated. Additionally, each such film magazine 44 is provided with a picture framing aperture 48 which, when the magazine is appropriately positioned within the receiving chamber 42, is aligned with the optical system of the camera 10 to facilitate film exposure operations. Disposed within the film magazine 44 is a spring assembly 50 that acts against a plate 52 to continually urge the film unit 46 closest to the picture framing aperture 48 into the proper focal plane for exposure purposes. An elongated opening 54 is provided in the housing of the film magazine 44 to facilitate the advancement of each film unit 46 from the magazine towards the spread roller assembly 32 after its exposure.

The member 12 comprises a housing for the camera's lens-shutter assembly 56 and an actuator button 58 for initiating camera operations, and is adapted to rotate about the pivot 26 into a position (See FIG. 10) in front of the spread roller assembly 32 adjacent the housing member 28 when the camera is rearranged from its extended condition into its collapsed condition. When the camera is extended as shown in FIGS. 1 and 3, the housing members 12, 14, 16 and 18 cooperate with a collapsible bellows 60 secured thereto to form a sixsided exposure chamber 62.

In addition to an objective lens 63 mounted in the housing member 12, the camera's optical system includes a planar mirror 64 mounted on an interior wall of the housing member 16 to reflect light rays passing through the objective lens towards the camera's focal plane. A plate-like reflex member 66 is pivotally coupled to the housing member 18 at a pivot 68 for displacement between its position shown in FIG. 3 wherein it overlies the picture framing aperture 48 and its position shown in phantom in that figure of the drawings wherein it is disposed in overlying adjacency with respect to the planar mirror 64. This reflex member 66 includes a viewing surface 70 preferably comprising a suitable Fresnel configuration and a planar light reflective surface 72. The operation of this reflex member 66 will subsequently be set forth in more detail. The optical system of the camera 10 further includes a collapsible viewing device 74 appropriately mounted to the housing member 14. This viewing device 74 comprises a curved mirror 76, an eye lens 78 and appropriate housing structure, including telescoping blades 80 serving to define a viewing chamber 82 when the viewing device is extended. Appropriate linkages 84 and 86 are included with the viewing device 74 to respectively effect the erection of the curved mirror 76 and eye lens 78 into their operative positions responsive to the camera's being rearranged from its collapsed or storage condition into its extended operative condition.

This unique arrangement of optical elements provides the camera 10 with a single lens reflex characteristic wherein it is operated first in a viewing and focusing mode and thereafter in an exposure and processing mode. As best seen in FIG. 3, during the viewing and focusing mode of operation, the reflex member 66 rests in light-tight engagement over the film magazine's picture framing aperture 48. The camera's lens-shutter assembly 56 includes a normally opened shutter which, when the camera is extended, permits image-carrying light rays from the objective lens 63 to pass across the chamber 62 to impinge upon the mirror 64 that reflects such light rays onto the viewing surface 70 of the reflex member 66 whereon is thus formed an image of the scene to be photographed. Light rays emanating from the image formed on the viewing surface 70 of the reflex member 66 are directed upwardly therefrom to the mirror 64 from which they are thence reflected towards the camera's housing member 14. As these light rays are reflected from the mirror 64, they pass first through a small aperture 88 in the bellows 60 that serves to define an entrance pupil for the viewing device 74, and then through a larger aperture 90 in housing member 14 to impinge upon the curved mirror 76. This curved mirror 76 includes a concave ellipsoidal shaped reflecting surface which redirects these light rays rearwardly through the lens 78 toward an eye station 92. A real, erect, and unreverted aerial image diagrammatically designated by an arrow 94 is formed by the concave mirror 76 and magnified by the eye lens 78 to facilitate viewing and focusing from the eye station 92. In this connection, the housing member 12 additionally serves to mount a focus control knob 96 (See FIG. 1) which may be manually rotated to effect an appropriate rearward or forward displacement of the lens 63.

To record an image of a subject on the forwardmost film unit 46, the camera's normally opened shutter is closed and the reflex member 66 pivoted into its position shown in phantom in FIG. 3. Thus, when the shutter is subsequently actuated, image-carrying light rays from the subject enter the camera's chamber 62 through the objective lens 63 and are reflected by the reflective surface 72 of the reflex member 66 onto the film unit 46 disposed across the picture framing aperture 48 of the film magazine 44.

To briefly summarize film exposure operations, the camera 10 is first arranged into its extended condition with the reflex member 66 positioned across the picture framing aperture 48 of the magazine 44. The photographer then views an aerial image of the subject through the eye lens 78 while adjusting the focus control knob 96. Once the image on the viewing surface 70 of the reflex member 66, as viewed through the viewing device 74, is in sharp focus, the photographer actuates the button 58 mounted on the housing member 12. Means (not shown) are included in the camera 10 which are responsive to the actuation of the button 58 to effect the following sequence of system operations. First, the normally open shutter closes and a blocking member (not shown) covers the aperture 88 in the bellows 60 causing the exposure chamber 62 to assume a light-tight condition. Next the reflex member 66 is pivoted upwardly within the chamber 62 into its position shown in phantom in FIG. 3 uncovering the picture framing aperture 48 and the film unit 46 most adjacent thereto. The camera's shutter is then opened to admit image-carrying light rays from the scene into the exposure chamber 62, which light rays are then reflected by the surface 72 of the reflex member 66 onto the forwardmost film unit 46 to effect the recording of a latent image therein. After an appropriate exposure interval, the shutter again closes, the reflex member 66 is returned to its initial position wherein it overlies the picture framing aperture 48 and the shutter and viewing device aperture 88 are opened. In connection with these operations, it should be noted that the camera 10 includes an automatic exposure control system (not shown) which may take any suitable form, having the capability of automatically defining the aforementioned appropriate exposure control interval. The power supply for the automatic exposure control system, for certain system operations previously described and for system operations yet to be described may typically comprise a suitable battery 98 contained within each film magazine 44 or, alternately, provided within the camera 10 separate from the film magazine.

After a forwardmost film unit 46 has been exposed to record a latent image of a scene in its photosensitive layer, it is advanced from the film magazine 44 through the elongated opening 54, thence between the rollers 34 and 36 and from the camera 10 through an exit means 100 in the housing member 28. In this respect, the roller 34 constitutes a drive roller in that it has a spur gear 102 axially connected thereto which in turn is coupled to the camera's motor 104 through an appropriate gear train, not shown in its entirety, but comprising a pinion 106. Additionally, the camera 10 includes a picking mechanism 108 also connected to the camera's motor 104 by any suitable arrangement (not shown). Preferably, the operation of the aforementioned exposure sequence and the picking mechanism 108 and pinion 106 is automatically responsive to actuation of the button 58. More specifically, depressing the button 58 first effects an exposure of the film unit 46 in the manner previously described, and, immediately upon the return of the reflex member 66 to its position overlaying the picture framing aperture 48, the picking mechanism 108 is actuated to engage the rear edge of the exposed film unit and advance it from the magazine 44 through the magazine's opening 54 into the bite of the rotating rollers 34 and 36. The drive roller 34 then serves to progressively advance the film unit 46 through the spread roller assembly 32 and thence from the camera 10 through its exit means 100.

As the film unit passes between the rollers 34 and 36, the compressive force exerted thereon by those rollers first effects a rupturing of a pod 112 of processing fluid 114. These rollers 34 and 36 then serve to progressively distribute the released mass of processing fluid 114 across the exposed photosensitive system of the film unit 46 as that unit progressively passes through the spread roller assembly 32. As the film unit 46 emerges from the spread roller assembly 32, it is deflected by a preferably opaque plate-like member 116 towards the exit means 100. The arrangement of the opaque plate-like member 116 and of the exit means 100 in cameras of this general type and the functions performed by same are the subject of the aforementioned concurrently filed copending U.S. Pat. application Ser. No. 246,703. Briefly stated, film units 46 of the type indicated typically include a light transparent outside face or surface defining layer and the plate-like member 116 is preferably opaque to light shield sections thereof intermediate the spread roller assembly 32 and the camera's exit means 100, thereby alleviating "fogging" of sections of that film unit yet untreated with the processing fluid 114 by the "light-piping" phenomenon. Since such film units 46 typically have an inherent "stiffness," as the exposed film unit is deflected towards the exit means 100, progressive sections thereof in advance of the rollers 34 and 36 are urged against a subsequently to be described arrangement of the camera system to control the movement of the mass of fluid 114 across the film unit's photosensitive system.

The plate-like member 116 is connected to the housing member 28 at pivot 118 for displacement between its operative position shown in FIG. 3 and an inoperative position shown in FIG. 10. Suitable spring means 120 continually urges the plate-like member 116 towards its operative position of FIG. 3. However, the camera 10 is designed so that, in the course of rearranging it from its extended position into its storage position, its lens-shutter housing 56 engages the plate-like member 116 and effects a displacement thereof into its position depicted in FIG. 10. At such times, i.e., when the camera is in its collapsed condition, the lens-shutter housing 56 is compactly stored in close adjacency to the housing member 28.

The camera's exit means 100 is defined by an elongated opening 122 in the housing member 28 and a resiliently flexible sheet metal component 124 which is mounted to the member 28 so as to extend across that opening. As the exposed film unit 46 is advanced from the spread roller assembly 32, it impinges upon the plate-like member 116 which redirects its path of movement towards the leading and free edge 126 of the sheet metal component 124. In its normal position, the leading edge 126 of the component 130 is positioned in close adjacency to, and preferably seated against, the edge 128 of the opening 122. Thus as the film unit 46 is advanced through the exit means 100, the sheet metal component 124 presses the adjacent section of that unit against the edge 128 of the opening 122 thereby serving to grip or retain the film unit once it has cleared the spread roller assembly 32.

Figures 4, 8, 9:
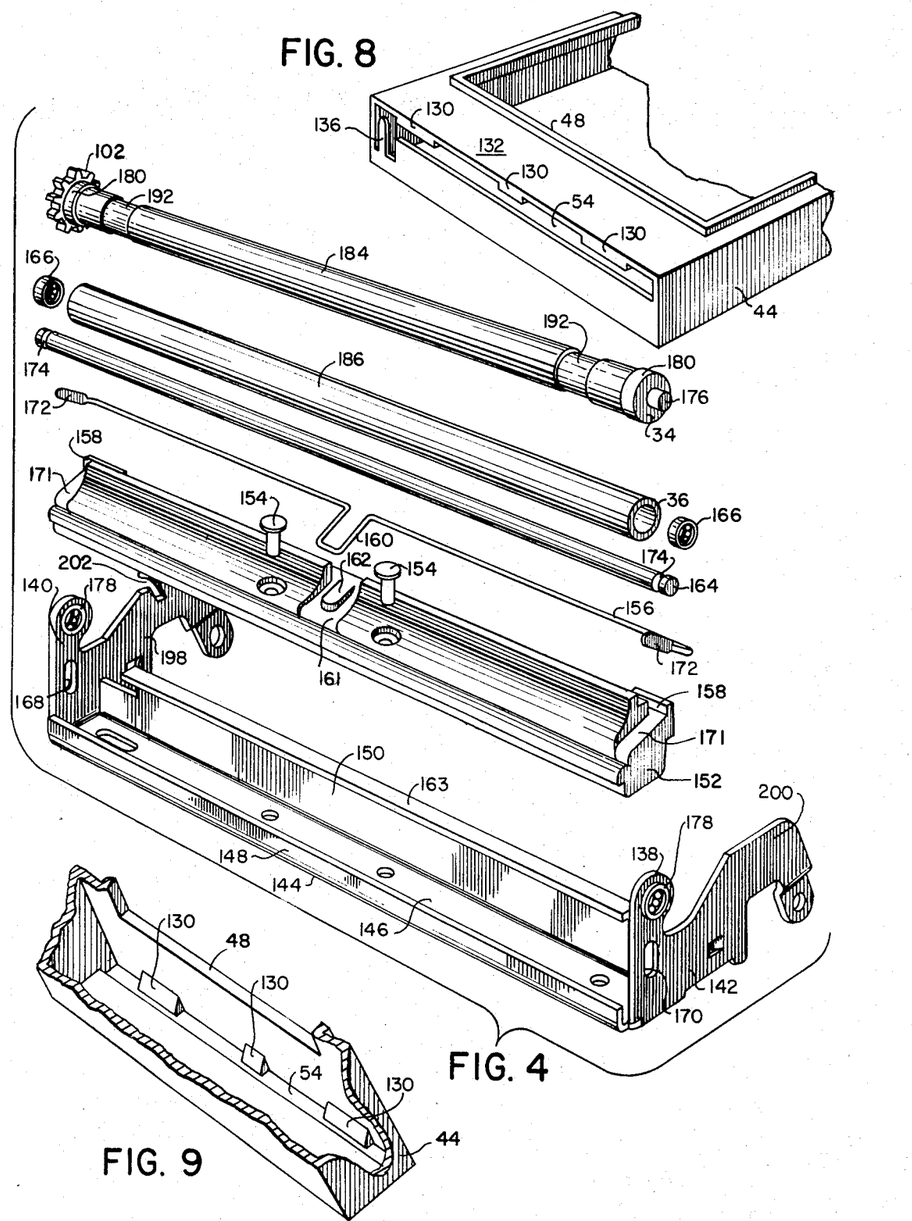
FIG. 4 constitutes an exploded diagrammatic view in perspective of the spread roller assembly of the camera shown in FIG. 1.
FIGS. 8 and 9 diagrammatically represent fragmentary perspective views of the film unit container or magazine employed in the camera of FIG. 1.

Referring now to FIGS. 8 and 9 of the drawings, it will be seen that certain features of the film magazine 44 have been more clearly illustrated therein. In this respect, the film magazine 44 includes a plurality of specially configured and strategically located projections or fingers 130 which in part serve to define the magazine's elongated opening 54. The nature of, the function performed by, and alternate arrangements for, this feature of the magazine 44 are set forth in considerable detail in copending U.S. application Ser. No. 246,701 by Richard R. Wareham et al. entitled PHOTOGRAPHIC PRODUCT AND APPARATUS filed concurrently with the present application. However, for our present purposes, it will be understood that as each exposed film unit 46 as advanced from the magazine 44, these projections exert a compressive force thereon at selected positions widthwise thereof. Thus, once the pod 112 of the film unit 46 has been ruptured, these projections 130 are adapted to control the movement of the mass of processing fluid 114 between, for example, an image-receiving element or layer and a photosensitive element or system of the exposed film unit 46 as it is advanced from the magazine 44. More specifically, they influence or serve to "flatten" the meniscus of the fluid 114, i.e., the leading edge of the fluid mass, widthwise of the film unit 46.

Preferably, the film magazine 44 including its projections 112 is formed of an appropriate polymer, such as polystyrene, which is somewhat flexible when molded into relatively thin structures. Under such circumstances, the portion 132 of the film magazine 44 from which the projections 130 depend, has an inherent flexibility. Thus, in order to preclude any undesirable flexing of this portion 132 of the film magazine 44 during film processing operations, the camera 10 includes a rigid support member 134 against which the magazine portion 132 is seated when the magazine is properly positioned within the receiving chamber 42 of the camera. The magazine 44 is also preferably formed with a finger 136 which assures that only one film unit 46 at a time is advanced from the magazine 44 towards the rollers 34 and 36 responsive to the operation of the picking mechanism 108.

The effect of the projections 130 on the mass of processing fluid 102 as the exposed film unit 46 is advanced therepast is a function of the forces exerted on the film unit by the spring assembly 50 and the plate-like member 116.

As indicated, the present invention is particularly directed to certain aspects of the camera's spread roller assembly 32, the nature of which may best be understood by now referring to FIG. 4 of the drawings. As shown therein, the assembly 32 comprises a spread roll bracket 138 preferably formed from a unitary piece of sheet metal such as a stainless or carbon steel. This bracket 138 includes a pair of upturned ears 140 and 142 joined together by a central portion 144 comprising a support 146 and spaced apart substantially parallel flange portions 148 and 150. A rigid structural support member 152 is configured to seat against the support 146 intermediate the ears 140 and 142 and nested between the flange portions 148 and 150 of the bracket 138. This member 152 is preferably formed of any suitable material such as 30–40 percent glass filled thermoplastics such as nylon, polycarbonate, acrylonitrile-butadiene-styrene, polysulfone or glass filled thermosetting phenolic molding compounds, which is light in weight relative to the material employed to form the bracket 138. A pair of rivets 154 serve to secure the support member 152 to the bracket 138. A specially configured torsion spring 156 rests in tracks 158 of the support member 152 with a generally U-shaped central portion 160 thereof extending around a lip 162 formed on the support member and seated against a supporting surface 161 of that member. When the spring 156 is positioned on the support member 152 and the support member connected to the bracket 138 as indicated, an elongated projection 163 depending from the bracket's flange portion 150 serves to retain the spring in position on the support member. In this manner the spring 156 is unexposed, i.e., retained within the confines of the bracket 138.

Figures 5, 6, 7:
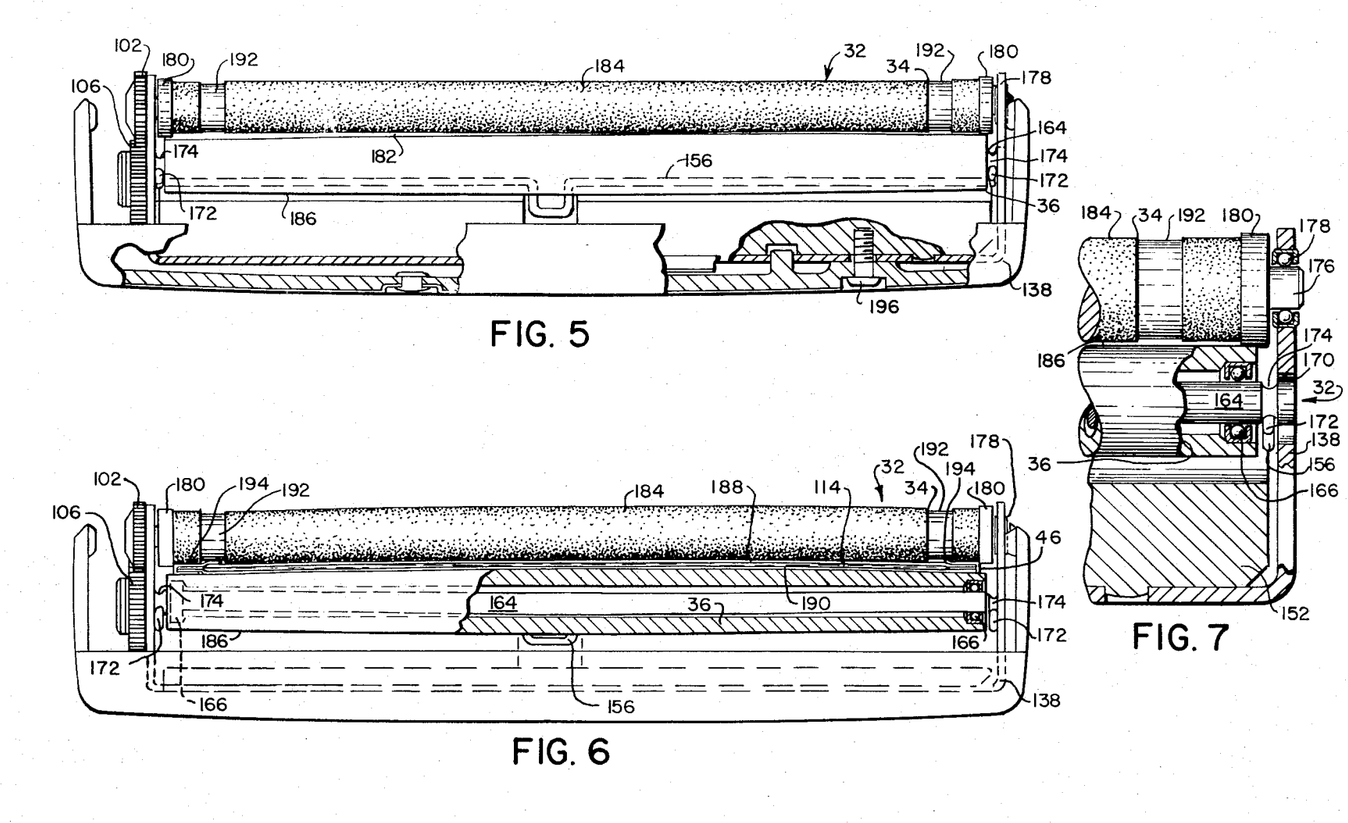
FIG. 5 is a diagrammatic, partially cut-away, front elevation view of the spread roller assembly of FIG. 4 mounted in the camera of FIG. 1.
FIG. 6 is a view very similar to that of FIG. 5 except that it illustrates the spread roller assembly at such time as a film unit is being advanced therethrough.
FIG. 7 constitutes an enlarged section, partially cutaway, of the spread roller assembly as depicted in FIG. 6.

The roller 36 is hollow and therefore relatively light in weight and of low inertia, being rotatably mounted on a shaft 164 by a pair of ball bearing assemblies 166 (See FIG. 7). Respective ends of the shaft 164 extend through elongated slots 168 and 170 provided in the ears 140 and 142 of the bracket 138. Flattened ends 172 of the torsion spring 156 seat in appropriately positioned annular recesses 174 of the shaft 164 so that the force of that spring continually urges the roller 36 towards its upwardmost position within the slots 168 and 170 as viewed in FIG. 4. It will be noted that the support member 152 is configured with a pair of cutouts 171 to accommodate initial loading of the spring 156 and subsequent displacement of its flattened ends 172 responsive to translatory movement of the shaft 164 along the bracket's slots 168 and 170.

Extensions 176 of the roller 34 are respectively journaled to the bracket 138 by ball bearing assemblies 178 mounted in the bracket's ears 140 and 142. Provided on the roller 34 are a pair of spaced apart annular collars 180 against which the roller 36 is initially seated under the force of the torsion spring 156. As best shown in FIG. 5 of the drawings, these collars 180 determine a controlled minimum gap 182 between the sheet-contacting facing surfaces 184 and 186 of the rollers 34 and 36 which facilitates the initial introduction of a film unit therebetween. As the film unit 46 is introduced between the rollers 34 and 36 (See FIG. 6) it effects a displacement of the roller 36 away from the roller 34 against the force exerted on the roller 36 by the torsion spring 156. As the exposed film unit 46 is advanced between the rollers 34 and 36, the compressive force exerted thereon by same effects a spreading of the processing fluid 114 in a layer between two elements or layers 188 and 190 of the film unit. Preferably, the roller 34 is provided with a pair of spaced apart annular recesses 192 strategically positioned as shown to receive selected portions of specially configured longitudinal edge bindings 194 of the film unit 46 in order to preclude the "red-framing" effect in accordance with the teachings of U.S. Pat. No. 3,647,441 by Albert J. Bachelder entitled PHOTOGRAPHIC APPARATUS AND METHOD issued on Mar. 7, 1972.

It will be appreciated that in this arrangement the force exerted by the torsion spring 156 is substantially transmitted from the roller 36 to the roller 34 through the edge bindings 194 of the film unit 46. Thus, by strategically locating the bearing assemblies 166 under these edge bindings 194, i.e., under these longitudinal edges of the film unit having an increased thickness, as best shown in FIG. 7 and employing a hollow roller 36, deflection of that roller is virtually eliminated, any deflection in the roller 36 – shaft 164 assembly being substantially accommodated by the shaft 164 itself. However, a similar situation does not exist in the case of the roller 34 which may experience a certain amount of deflection (diagrammatically depicted in FIG. 6). As a film unit 46 is advanced lengthwise between the rollers 34 and 36, it is desired to effect the spreading of a layer of the processing fluid 114 thereacross having a substantially uniform thickness. The nature of the layer of fluid 114 spread by the rollers 34 and 36 is dependent upon many system parameters including the type of film units, spring forces, deflection of the rollers, profile contours of the sheet-contacting facing surfaces, etc. One method of providing a uniform fluid layer is to retain certain system parameters constant and vary the profile contours of the sheet-contacting facing surfaces until the desired result has been achieved. In this manner it has been determined in systems of this general type, that a uniform layer of fluid 114 is realized by employing an initially substantially straight sheet-contacting facing surface 184 on the roller 34 and a sheet-contacting facing surface 186 on the hollow roller 36 initially having a predetermined convex profile configuration (See FIG. 6). In order to illustrate this concept and other concepts disclosed herein, certain dimensions have been reflected on FIGS. 5 and 6. However, it is to be expressly understood that these dimensions are exemplary only and are not to be interpreted as restricting the scope of the present invention in any manner.

In this unique arrangement, any frictional forces in the roller 36 – shaft 164 assembly resulting from twisting or cocking of the bearing assemblies 166 are absorbed by the shaft 164 which is basically a non-rotating component. Thus, such frictional forces are not transmitted from that assembly back to the battery 98 thereby reducing the load on that energy source. Most significantly, frictional forces of the assembly 32 have been minimized by providing an arrangement wherein there is a non-rotating contact between the spring 156 and the shaft 164.

One of the advantages of the spread roller assembly 32 is that it provides for a uniquely compact camera structure. In this context it will be appreciated that the absolute minimum size of a self-developing camera in the dimension lengthwise of its fluid spreading elements is determined by the width of the film unit processed therein. It is therefore desirable to minimize the overall size of a spread roller assembly in the dimension of the length of its rollers to the extent that it must exceed the length of the sheet-contacting facing surfaces of its rollers. This desired result has been achieved in the spread roller assembly 32. First, the use of the sheet metal bracket 138, with its relatively thin ears 140 and 142 in combination with the relatively light and thick rigid structural support member 152 provides for a relatively compact assembly. As indicated, the thickness of the ears 140 and 142 may be, and have been, minimized, while the support member 152 provides the structural rigidity required by the assembly in a light weight arrangement. Secondly, since there is only sliding frictional contact between the bracket's ears 140 and 142 and the roller 36 – shaft 164 assembly, as opposed to rotational frictional contact therebetween, these considerations place no undesirable burden on the thickness of the ears 140 and 142 in the present design. In other words, by minimizing the frictional forces between the roller 36 – shaft 164 assembly and the bracket 138, the thickness of the bracket's ears 140 and 142 may be minimized. Thirdly, this arrangement provides spring means 156 positioned entirely within the space defined by the bracket's ears 140 and 142, and the flattened nature of the ends 172 of the spring means permits the space which must be provided to accommodate same intermediate the respective ends of the roller 36 and the inside faces of the ears 140 and 142 to be minimized.

Advancement of the film unit 46 through the spread roller assembly 32 is facilitated by providing the roller 34 with a relatively high friction film driving characteristic. In this context, it is desirable that the relatively high friction be provided with elastomeric types of materials such as urethane or rubber. Alternately, high friction non-elastomeric materials, such as a tungsten carbide alloy, may be employed. It has also been found that, in order to effect a smooth transport of an exposed film unit 46 from the film magazine 44 into the bite of the rollers 34 and 36, it is desirable to impart rotary motion to the rollers 34 and 36 prior to their being engaged by the film unit. Consequently, in the arrangement provided, frictional contact between the collars 180 of the roller 34 and the roller 36 impart a rotary motion to the latter roller prior to an exposed film unit 46 being advanced into the bite of these rollers by the picking mechanism 108. It will be recognized that, where the roller 34 serves to drive the roller 36 in the manner described, there will be periodic impacts between parts of the two rollers. More specifically, as an exposed film unit 46 leaves the bite of the rollers 34 and 36, the force exerted on the roller 36 by the torsion spring 156 causes the roller 36 to impact against the annular collars 180 of the roller 34. However, the aforementioned elastomeric materials such as urethane and rubber do not only have the desirable relatively high friction characteristic but also are relatively impact sensitive in that, under impact they tend not to retain dimensional stability. Under these circumstances, the structural integrity of these contacting surfaces of the rollers 34 and 36 is enhanced by forming same of relatively low friction, impact resistant materials. Therefore, the roller 36 has been advantageously formed of a relatively impact resistant, low friction material such as a stainless steel, and a main body portion, including the annular collars 180, of the roller 34 has been formed of a similar material. The sheet-contacting facing surface 184 of the roller 34 comprises a thin coating of, for instance, urethane applied by any suitable process to an appropriate intermediate section of the aforementioned main body portion of the roller 34. This unique arrangement provides the roller 34 with a most desirable relatively high friction sheet-contacting facing surface 184 which advantageously is never permitted to contact the facing surface 186 of the roller 36, while the contacting surfaces between the rollers 34 and 36 comprise impact resistant, relatively low friction materials. Additionally, the use of an elastomeric sheet-contacting facing surface 184 facilitates the spreading of a uniform layer of the fluid 114 widthwise of the film unit 46 since its resiliently compressible characteristic accommodates a certain amount of deflection experienced by the roller 34. This same characteristic of the facing surface 184 serves to dampen vibrations of the spreader roller 34 thereby facilitating the uniformity of the layer of fluid 114 spread between the elements or layers of the film unit 46. The fact that the facing surface 184 is precluded from contacting the facing surface 186 avoids any "compression set" of the elastomeric material which would adversely affect its ability to spread a uniform layer of fluid 114 and increase the inertia of the roller 34.

It will be seen by referring to FIG. 5 that a plurality of screws 196 serve to secure the spread roll bracket 132 to the camera's housing member 28. As best seen in FIGS. 3 and 4, the pivot 30 is in fact defined by specially configured projections 198 and 200 of the bracket's ears 140 and 142, respectively. The projection 198 includes a detent 202 which cooperates with complementary releasable latching means (not shown) on the camera 10 when the housing member 28 is in its position depicted in FIG. 3 to lock that housing member in its normal functioning relationship with respect to the other components of the camera. When the camera 10 is in its operative condition, the rear face of the bracket's flange portion 150 serves to locate the film magazine 44 in its operative position within the camera's receiving chamber 42. For instance, forward movement of the film magazine 44 responsive to the action of the picking mechanism 108 is limited by the spread roll bracket 32. Thus the spread roll bracket 32 is uniquely configured to maintain a predetermined distance between the rollers 34 and 36 and the means within the camera system, comprising the magazine's projections 130, for controlling the movement of the mass of processing fluid 114 between layers of the exposed film unit 46 as that unit is advanced from the film magazine through the roller assembly 32 and the camera's exit means 100. Additionally, the bracket 32 engages the film magazine 44 to retain it in its operative relationship with respect to the camera's lens 63.

The invention has been described for use in connection with a particular type of film unit and compatible camera structure for illustrative purposes only. It will be appreciated that it lends itself for use with other types of film, for instance that described in U.S. Pat. No. 3,594,164 by Howard G. Rogers entitled PHOTOGRAPHIC COLOR DIFFUSION-TRANSFER PROCESS AND FILM UNIT USED THEREIN, and compatible camera structure. Additionally this invention may be employed to spread a processing fluid between separate sheets of photographic materials or between a film unit and simply a spreader sheet.

Those familiar with the photographic arts will readily appreciate the novel and highly unique advantages of this invention. Most importantly, a uniquely lightweight, compact fluid spreading system has been provided which also serves to locate a film magazine in its operative position within a self-developing camera system.

This invention may be practiced or embodied in still other ways without departing from the spirit or essential character thereof. The embodiment described herein is therefore illustrative and not restrictive, the scope of the invention being indicated by the appended claims and all variations which come within the meaning of the claims are intended to be embraced therein.

What is claimed is:

1. Photographic apparatus for spreading a processing fluid in a layer between a pair of elements, at least one of which forms part of a film unit, said apparatus comprising:

a mounting bracket formed of relatively thin sheet metal including a pair of substantially parallel ears connected together by an elongated support;

a first spreader element, including an elongated sheet-containing facing surface, mounted between said bracket ears;

a second spreader element, including an elongated sheet-contacting facing surface, mounted between said bracket ears for translatory displacement towards and away from said first spreader element, said sheet-contacting facing surfaces being disposed in juxtaposition;

means for yieldably urging said spreader elements towards one another;

means for limiting the movement of said spreader elements towards one another under the influence of said urging means to define a minimum gap between their juxtaposed sheet-contacting facing surfaces to facilitate the introduction therebetween of the superposed leading edges of such pair of elements; and an elongated rigid support member formed of a material substantially lighter in weight than said metal connected to said bracket support to provide a relatively compact light weight assembly comprising said bracket and said elongated rigid support member having sufficient rigidity to substantially preclude deflection thereof during film processing operations wherein said spreader elements serve to spread a layer of such processing fluid between such pair of elements as such pair of elements are advanced between said spreader elements.

2. The apparatus of claim 1 wherein said elongated support member is formed of a polymeric material.

3. The apparatus of claim 1 wherein said bracket and said elongated rigid support member in combination comprise means for retaining said urging means.

4. The apparatus of claim 3 wherein said urging means comprises a torsion spring and said retaining means comprises a track on said elongated rigid support member to receive a portion of said torsion spring and a projection of said bracket overlying said spring portion.

5. The apparatus of claim 1 wherein said urging means comprises an elongated torsion spring extending across said elongated rigid support member having offset ends adapted to exert a force to said second spreader element urging it towards said first spreader element and a central portion configured to seat against a supporting surface of said elongated rigid support member to preclude its rotary movement thereby facilitating the establishment of said force.

6. The apparatus of claim 1 wherein said urging means comprises a torsion spring supported by said elongated rigid support member.

7. The apparatus of claim 1 wherein said urging means comprises spring means having force applying ends acting intermediate each end of said sheet-contacting facing surface of said second spreader element and the adjacent said bracket ear.

8. The apparatus of claim 7 wherein said spring means comprises a torsion spring supported by said elongated rigid support member.

9. The apparatus of claim 8 wherein said torsion spring ends are flattened to facilitate the compactness of said apparatus lengthwise of said spreader elements.

10. Photographic apparatus for spreading a processing fluid in a layer between a pair of elements, at least one of which forms part of a film unit, said apparatus comprising:
a mounting bracket including a pair of substantially parallel ears connected together by an elongated support;
a first spreader element, including an elongated sheet-contacting facing surface, mounted between said bracket ears;
a second spreader element, including an elongated sheet-contacting facing surface, mounted between said bracket ears for translatory displacement towards and away from said first spreader element, said sheet-contacting facing surfaces being disposed in juxtaposition;
an elongated torsion spring having offset ends and an offset central portion;
means for mounting said torsion spring with its said offset ends adapted to exert a force to said second spreader element while precluding rotary movement of its said central portion thereby facilitating the establishment of said force so that said second spreader element is yieldably urged toward said first spreader element; and
means for limiting the movement of said second spreader element towards said first spreader element under the influence of said torsion spring to define a minimum gap between their juxtaposed sheet-contacting facing surfaces to facilitate the introduction therebetween of the superposed leading edges of such pair of elements, whereby said spreader elements serve to spread a layer of such processing fluid between such pair of elements as such pair of elements are advanced between said spreader elements.

11. The apparatus of claim 10 wherein said offset ends of said torsion spring act intermediate each end of said sheet-contacting facing surface of said second spreader element and the adjacent said bracket ear.

12. The apparatus of claim 10 wherein said offset ends of said torsion spring are flattened to facilitate the compactness of said apparatus lengthwise of said spreader elements.

13. The apparatus of claim 10 wherein said offset central portion of said torsion spring is substantially U-shaped.

14. The apparatus of claim 12 wherein said offset central portion of said torsion spring is substantially U-shaped.

15. Photographic apparatus for spreading a processing fluid in a layer between a pair of elements, at least one of which forms part of a film unit, said apparatus comprising:
a mounting bracket including a pair of substantially parallel ears connected together by an elongated support;
a first spreader element, including an elongated sheet-contacting facing surface, mounted between said bracket ears;
a hollow spreader roller including an elongated sheet-contacting facing surface;
an elongated shaft mounted between said bracket ears and extending through said hollow spreader roller;
means for rotatably mounting said hollow spreader roller on said shaft with its said sheet-contacting facing surface juxtaposed with respect to said sheet-contacting facing surface of said first spreader element;
an elongated torsion spring having offset ends and an offset central portion;
means for mounting said torsion spring with each of its said offset ends engaging said shaft intermediate an end of said hollow spreader roller and an adjacent bracket ear while precluding rotary movement of its said central portion to thereby yieldably urge said hollow spreader roller towards said first spreader element; and
means for limiting the movement of said hollow spreader roller towards said first spreader element under the influence of said torsion spring to define a minimum gap between their said juxtaposed sheet-contacting facing surfaces to facilitate the introduction therebetween of the superposed leading edges of such pair of elements, whereby said spreader elements serve to spread a layer of such processing fluid between such pair of elements as such pair of elements are advanced between said spreader elements.

16. The apparatus of claim 15 wherein said first spreader element comprises a spreader roller rotatably mounted between said bracket ears.

17. The apparatus of claim 16 additionally including means for connecting said first spreader element to an energy source to impart a rotary motion thereto.

18. The apparatus of claim 17 wherein said movement limiting means serves to impart a rotary motion to said hollow spreader roller when said first spreader element is connected to such energy source.

19. The apparatus of claim 15 wherein said offset ends of said torsion spring are flattened to facilitate the compactness of said apparatus lengthwise of said spreader elements.

20. The apparatus of claim 15 wherein said shaft includes a pair of annular recesses located to respectively receive said offset ends of said torsion spring.

21. The apparatus of claim 15 wherein said mounting bracket is formed of relatively thin sheet metal and said torsion spring mounting means comprises an elongated rigid support member, formed of a material substantially lighter in weight than said metal, connected to said bracket support to provide a relatively compact light weight assembly comprising said bracket and said elongated rigid support member having sufficient rigidity to substantially preclude deflection thereof during film processing operations.

22. The apparatus of claim 21 wherein said rigid support member comprises a track to receive a portion of said torsion spring and said bracket includes a projection overlying said spring portion to retain said torsion spring in operative position on said rigid support member.

* * * * *

UNITED STATES PATENT OFFICE
CERTIFICATE OF CORRECTION

Patent No. 3,779,144　　　　　　　　Dated November 4, 1975

Inventor(s) Richard Paglia

It is certified that error appears in the above-identified patent and that said Letters Patent are hereby corrected as shown below:

Column 1, line 61, "to" should be --the--;

Column 7, line 58, "as" should be --is--;

Column 12, claim 1, line 47, "sheet containing" should be --sheet contacting;

Signed and Sealed this

*thirteenth* Day of *January 1976*

[SEAL]

Attest:

RUTH C. MASON
*Attesting Officer*

C. MARSHALL DANN
*Commissioner of Patents and Trademarks*